United States Patent Office 3,039,922
Patented June 19, 1962

3,039,922
METHOD OF ADMINISTERING TABLETS HAVING DECONGESTANT AND ANTI-HISTAMINIC ACTIVITY
Frank M. Berger, Princeton, and Kurt Hans Wielich, Cranbury, N.J., assignors to Carter Products, Inc., New York, N.Y., a corporation of Maryland
No Drawing. Filed Aug. 17, 1959, Ser. No. 833,993
4 Claims. (Cl. 167—55)

This invention relates to novel compositions of matter which possess decongestant and anti-histaminic activity, and wherein the active ingredients are capable of being administered through the oral mucosa. The invention also includes a novel method for the simultaneous administration of a decongestant and anti-histaminic agent.

The use of tablets, tablet triturates and/or troches for the absorption of various drugs from the oral cavity is well known. Drugs which may be administered in this manner usually are capable of penetrating the oral mucosa. Two modes of administration have been used for the administration of drugs from the oral cavity through the oral mucosa. One mode of administration is sublingual administration. A drug is administered sublingually by applying a tablet containing the active ingredient beneath the tongue and maintaining the tablet in this region for a sufficient period of time until the tablet disintegrates, whereupon the active ingredient is introduced into the blood and lymph channels by absorption through the sublingual mucosa. A second mode of administration is buccal administration. Buccal administration is very similar to sublingual administration except that the tablet, instead of being applied beneath the tongue, is applied between the cheek and gum. On disintegration of the buccal tablet the active ingredient is introduced into the blood and lymph channels by absorption through the buccal mucosa. For convenience sake, the term "sublingual" as used hereinafter, is meant to include any and all modes of administration wherein the active ingredient is administered through the oral mucosa such, for example, buccal administration as well as sublingual administration.

While sublingual administration of drugs is very desirable because it affords a direct route of administration, problems are encountered in its use. All drugs cannot be administered sublingually. Many drugs are not capable of penetrating the oral mucosa in significant amounts. Certain drugs which penetrate the oral mucosa cannot be administered sublingually because of their irritant effects in the oral cavity. Then too, the heretofore known sublingual tablets disintegrate rather slowly in the oral cavity. Thus, sublingual administration using such tablets is time consuming. This is not only undesirable from the patient's point of view because of the inconvenience encountered, but in certain instances it may hamper effective administration of the active ingredient.

Objects and advantages of the invention will be set forth in part hereinafter and in part will be obvious herefrom, or may be learned by practice with the invention, the same being realized and attained by means of the steps, methods, compositions of matter, combinations and improvements pointed out in the appended claims.

The invention consists in the novel compositions of matter, steps, methods, combinations and improvements herein shown and described.

It is an object of this invention to provide novel compositions of matter which possess decongestant and anti-histaminic activity and wherein the active ingredients are capable of being administered sublingually to warm-blooded animals including humans. A further object of this invention is to provide novel sublingual tablets having decongestant and anti-histaminic activity which disintegrate rapidly in the oral cavity of warm-blooded animals including humans. A further object of this invention is to provide a novel method for administering to warm-blooded animals including humans a composition having decongestant and anti-histaminic activity.

It has been found that sublingual tablets possessing decongestant and anti-histaminic activity, as well as having a high rate of disintegration in the oral cavity, may be produced by combining:

(1) A pharmacologically acceptable salt of phenylephrine such, for example, as phenylephrine HCl; and (2) A pharmacologically acceptable salt of chlorpheniramine such, for example, as chlorpheniramine maleate; and (3) A water soluble filler, such, as glycine (preferred), urea or lactose; and (4) A disintegrant such, for example, as corn starch (preferred), alginic acid or citrus pulp; and (5) A water-insoluble, crystalline or amorphous, non-hygroscopic filler such as tricalcium phosphate (preferred), calcium carbonate, magnesium carbonate, magnesium tartrate or mixed insoluble silicates; and (6) A lubricant such, for example, as magnesium stearate (preferred), calcium stearate, stearic acid, talc and "Carbowax 6000"; and (7) A binding agent such, for example, as gum acacia (preferred), sucrose, starch paste or methyl cellulose.

If so desired, flavoring agents may be incorporated in the tablet compositions of this invention such, for example, as orange flavor, peppermint flavor, etc. Also, sweetening agents may be included such, for example, as sodium sucaryl and sodium saccharin. Also, coloring agents may be incorporated in the tablet if so desired such, for example, as F.D. and C. Red No. 4 and F.D. and C. Yellow No. 5.

In setting forth the amounts of the ingredients used in accordance with the present invention, the active ingredients will be expressed in milligram dosages, while the remaining essential components will be expressed in percent by weight of the total composition including the active ingredients.

In general, the salt of chlorpheniramine is in an amount from about 0.5 to 4 mg. per tablet, and preferably about 1 to 2 mg. In general, the salt of phenylepherine is in an amount from about 5 to 25 mg., and preferably 5 to 10 mg.

The excipients used as water soluble filler is in general in an amount from about 15 to 55 percent by weight of the total composition, and preferably 25 to 40 percent by weight. The disintegrant is in general in an amount from about 4 to 12 percent by weight of the total composition, and preferably 6 to 10 percent by weight. The water insoluble filler is in general in an amount from about 15 to 55 percent by weight of the total composition, and preferably 25 to 40 percent by weight. The lubricant is in general in an amount from about 0.3 to 2 percent by weight of the total composition, and preferably 0.9 to 1.5 percent by weight. The binding agent is in general in an amount from about 0.5 to 5.5 percent by weight of the total composition, and preferably 0.5 to 2 percent by weight.

The tablets of this invention provide a composition having decongestant and anti-histaminic activity wherein the active ingredients may be effectively administered sublingually. The reasons for this are: (1) the tablets of this invention are capable of rapid disintegration in the oral cavity, and (2) on disintegration of a tablet both the specific decongestant (phenylephrine HCl) and the specific anti-histaminic agent (chlorpheniramine maleate) are capable of penetrating the oral mucosa to exert their known therapeutic activity. It should be realized that many known tablets which are suitable for internal administration by the oral route are not acceptable for sublingual administration because of their slow rate of disintegration in the oral activity. While such tablets disintegrate rapidly in the digestive tract or in the intestines, if enteric coated, their rate of disintegration in the oral cavity is so slow that the active ingredients contained therein cannot be effectively administered.

Then too, many of the known decongestants and anti-histaminic agents which may be administered internally cannot be administered sublingually because of their inability to penetrate the sublingual mucosa.

The utilization of a water soluble filler such as glycine in the tablets of this invention has many advantages. First, it assists in the production of a tablet which disintegrates rapidly in the oral cavity. Second, such filler because of its water soluble nature reduces the amount of impalpable particles in the mouth on distintegration of the tablet in the oral cavity. It is preferred that the water soluble filler be glycine for it not only has the above-mentioned advantages, but also it is stable over a wide range of humidities and temperatures. Accordingly, the tablets of this invention employing glycine as the water soluble filler are stable under normal temperatures and humidities. Also, glycine is inert, i.e. it is not an active ingredient, and hence will not exert undesirable side effects.

In order to illustrate the invention more specifically, the following example is given:

Example I

Thirty-one parts of glycine are granulated with an aqueous solution containing 1.5 parts of acacia, 1.5 parts of a 1% solution of F, D and C Red No. 4 and 0.1 part of a 1% solution of F, D and C Yellow No. 5. 32.5 parts of tricalcium phosphate are granulated with an aqueous solution containing 0.3 part of a 1% solution of F, D and C Red No. 4 and 0.2 part of a 1% solution of F, D and C Yellow No. 5. Each of the above granulations is dried and screened to produce granules of a suitable size.

To these ingredients are added 2.0 parts of chlorpheniramine maleate, 10 parts of phenylephrine hydrochloride, 7.65 parts of corn starch, 1.0 part of magnesium stearate and 4.35 parts of a suitable flavoring and sweetening agent. The materials are mixed and tableted using standard equipment and procedures for this purpose, into tablets weighing 90 milligrams each and having a hardness and disintegration rate suitable for use as a sublingual medication.

The invention in its broader aspects is not limited to the specific steps, methods, compositions, combinations and improvements described but departures may be made therefrom within the scope of the accompanying claims without departing from the principles of the invention and without sacrificing its chief advantages.

What is claimed is:

1. The method of administering a decongestant and an anti-histaminic agent to a warm blooded animal by absorption from its oral cavity, comprising applying to the oral mucosa of said animal a tablet comprising a pharmacologically acceptable salt of phenylephrine capable of being absorbed through the oral mucosa of said animal to exert decongestant activity, a pharmacologically acceptable salt of chlorpheniramine capable of being absorbed through the oral mucosa of said animal to exert anti-histaminic activity, a water soluble filler, a disintegrant, a water insoluble inert filler, a lubricant and a binding agent and, permitting the tablet to remain in contact with the oral mucosa for a sufficient period of time whereby the phenylephrine salt and the chlorpheniramine salt are absorbed from the oral cavity.

2. The method, according to claim 1, wherein the phenylephrine salt is phenylephrine hydrochloride, and the chlorpheniramine salt is chlorpheniramine maleate.

3. The method, according to claim 2, wherein the water soluble filler is glycine, and the water insoluble filler is tricalcium phosphate.

4. The method, according to claim 3, wherein the disintegrant is corn starch.

References Cited in the file of this patent

FOREIGN PATENTS 213,736     Australia _____ Jan. 8, 1958

OTHER REFERENCES

Feinberg: The Anti-histamines, 1950, The Year Book Publ., Inc., Chicago, Ill., page 182.

U.S. Dispensatory, 24th ed., 1947, Lippincott Co., Philadelphia, Pa., pages 59 and 60.

J.A.P.A. (Pract. Pharm. Ed.), vol. 16, No. 8, August 1955, pages 486, 487 and 490.